July 28, 1953  F. M. SLOUGH  2,646,688
PLURAL SPEED FRICTION DRIVE TRANSMISSION
FOR PHONOGRAPH TURNTABLES
Filed Oct. 13, 1948  4 Sheets-Sheet 2

Frank M. Slough, INVENTOR.
BY Frank M. Slough
and J. H. Slough

July 28, 1953   F. M. SLOUGH   2,646,688
PLURAL SPEED FRICTION DRIVE TRANSMISSION
FOR PHONOGRAPH TURNTABLES
Filed Oct. 13, 1948   4 Sheets-Sheet 3

Frank M Slough INVENTOR.
BY Frank M Slough
and J. H. Slough

Patented July 28, 1953

2,646,688

UNITED STATES PATENT OFFICE 2,646,688

PLURAL SPEED FRICTION DRIVE TRANSMISSION FOR PHONOGRAPH TURNTABLES

Frank M. Slough, Lakewood, Ohio, assignor to The General Industries Company, Elyria, Ohio, a corporation of Ohio Application October 13, 1948, Serial No. 54,246

22 Claims. (Cl. 74—199)

My invention relates to a plural speed friction drive mechanism for phonograph turntables and relates more particularly to the transmission mechanism therefore which may be manually adjusted to frictionally drive a phonograph turntable at selected different rotational speeds.

My invention relates to a friction drive mechanism of the foregoing type comprising, besides a motor power shaft and a drive wheel peripherally engageable with a lateral surface of an annular turntable flange, a plurality of idler pulley elements all having upper and lower pulley portions and differing in the relationship between the diameters of their upper and lower pulley portions, any thereof being adapted to be selectively moved laterally to alone make peripheral engagement, by its upper pulley portion with said wheel periphery, and concurrently by its lower portion with an element of said motor shaft.

My invention involves also the provision of improved selective adjustment means comprising a handle, adapted when said handle is moved from any of a plurality of stations, in a path of like directional nature throughout its extent, to another station in said path, that said pulley elements may be interchangeably disposed in driving relation with both said wheel and motor shaft.

An object of my invention is to provide a plural speed friction drive mechanism comprising a friction wheel which is adapted to frictionally communicate rotational movement to a turntable flange from the rotor shaft of an electric motor through any of a plurality of pulley elements which are interchangeably adapted to be brought into peripheral engagement with said idler wheel, the said pulley elements having upper and lower portions whose relative diameters, in the case of different elements, are in differing ratios, whereby the said friction wheel and a turntable rotated thereby may be driven at predetermined different rotational speeds.

Another object of my invention is to provide a plural-speed friction drive mechanism for driving phonograph turntables at pre-determined different rotational rates, in response to simple lateral movements of a manually actuatable handle, in a path of movement which is of like directional nature throughout its extent.

Another object of my invention is to provide a plural-speed friction driving mechanism for phonograph turntables which is simple and inexpensive in construction, and reliable in use.

Other objects of my invention, and the invention itself, will be readily understood by those skilled in the art to which my invention appertains, by reference to the following written description of a preferred embodiment of my invention wherein reference is had to the following drawings, whereof.

Referring now to the drawings, which illustrate a preferred embodiment of my invention, a typical main supporting plate 10 for a turntable such as that at 15, which is adapted to be rotated by a motor whose shaft 133, only, is shown in the drawings at different speeds, is of sheet metal and a supplemental plate 11 is pendantly removably supported from the main plate by three machine screws 12 thereby affording a three point suspension for the plate 11, said mounting screws being insulated from metallic contact with the plate 10 by rubber spacer elements or sleeves 14 in accord with present day common practice.

The turntable 15 may be carried on the post 16 in any well-known manner and preferably the post is journalled in a bearing 16¹, carried by the main plate 10, for free frictionless rotation. The turntable is provided with a pendant peripheral flange 15a preferably having a smooth cylindrical inner surface 15b with which the rubber peripheral tread 17' of the friction wheel 17 is adapted to be frictionally engaged, whereby rotation of the friction wheel may drive the turntable at a speed determined by the peripheral speed of the said wheel. The hub of the wheel 17 is journalled on an upstanding post 18, said post being fixed by its lower end to a yoke portion 19 of a floating U-shaped slide plate 20. Said slide element 20 is provided with a pair of parallel arms 21 and 22 which make bearing fitting engagement within slideways afforded by notches in horizontal radially extending flanges 23, 24, 25 and 26 of an I-shaped block 27 generally of the form of that shown in the prior Patent No. 2,421,910 dated June 10, 1947 to Herbert L. Hartman. The yoke of the slide 20 is suitably apertured to receive the post 18 and an arm 22 is suitably apertured at 28 to receive a stop pin 29. The I-shaped block 27 is mounted on a vertically disposed post 30 grooved in its head end and whose lower end is drive fitted into an aperture of the lower plate 11, whereby the block 27 is swingably secured to the supplemental plate 11.

Figure 1:
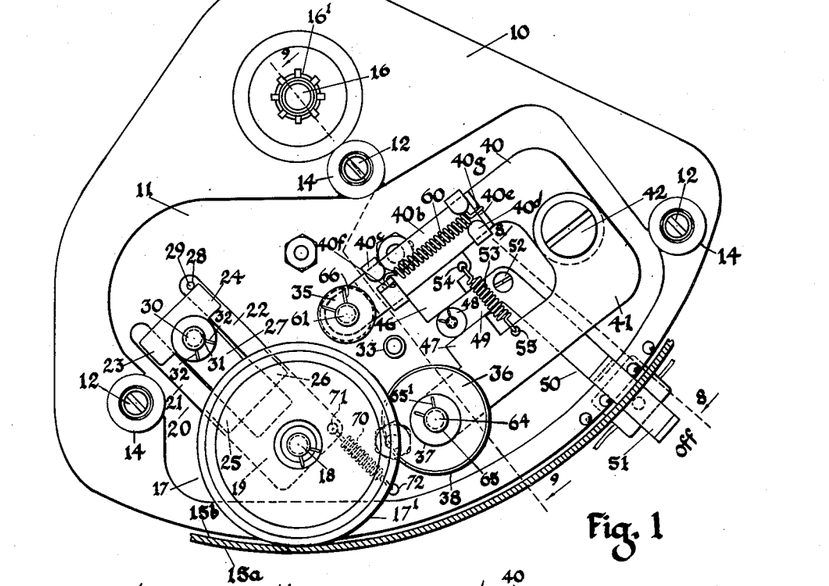
Fig. 1 is a top plan view of the transmission mechanism of my invention, the operating parts being shown in the "off" position, a portion of the turntable being shown in cross-section.

A retainer 31 of the so-called hair-pin type having arcuately bowed arm portions 32 is resiliently snapped into the groove of the pin 30. The motor is so secured to the supplemental plate as to permit its rotor shaft 33 to be projected through an aperture 34 in the supplemental plate 11, the walls of said aperture being radially interspaced from said shaft which extends co-axially therethrough. The said motor shaft 33 is positioned centrally midway between a pair of pulley elements 35 and 36, when the mechanism is in its inoperative position as best illustrated in Fig. 1. Each of the pulley elements 35 and 36 are provided with an upper and a lower pulley portion, which portions are respectively disposed at the respective levels of the wheel tread 17' and of the motor shaft pulley portion 33.

Figures 4, 5, 6, 7, 8, 9, 20, 21:
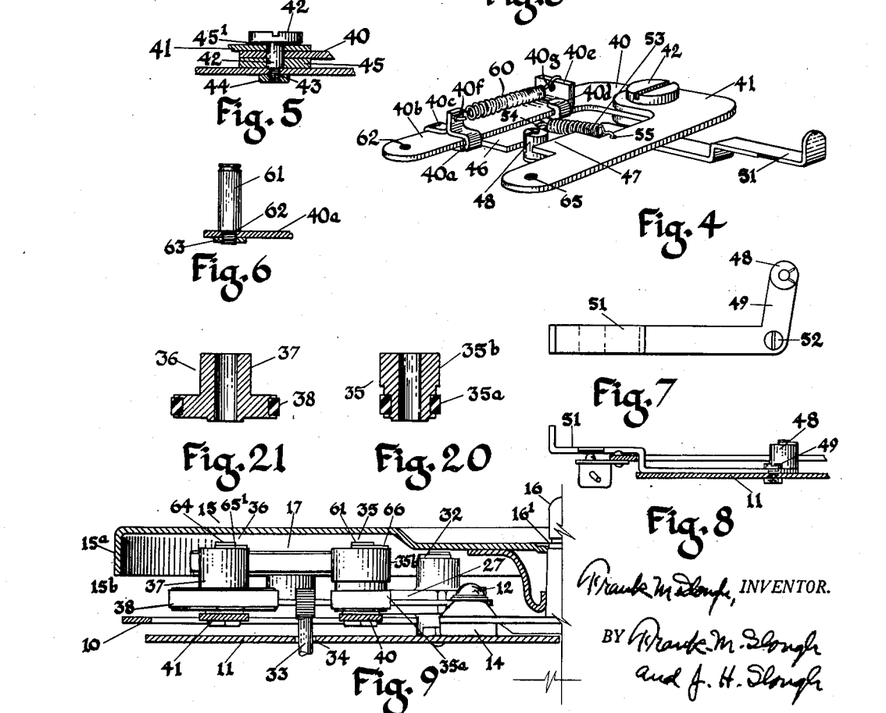
Fig. 4 is a perspective view of a manually actuated lever and pulley supporting means of Figs. 1, 2 and 3.
Fig. 5 is a sectional view of a pivotal connection for certain pulley mounts of Fig. 4 taken along the line 5—5 of Fig. 1.
Fig. 6 is a sectional view of one of certain pulley posts.
Fig. 7 is a top view of the lever of Figs. 1 to 4 inclusive.
Fig. 8 is a side plan view of the lever of Fig. 7.
Fig. 9 is an elevational view taken on the line 9—9 of Fig. 1.
Figs. 20 and 21 are vertical diametrical sectional views of the pulleys of Figs. 18 and 19, respectively.

The upper and lower pulley portions for the pulley element 35 are shown in Fig. 20, respectively at 35b and 35a, the latter being afforded by a cushioning rubber tread, whereas the upper and lower pulley portions of the pulley element 36 are shown in Fig. 21 respectively at 37 and 38, the latter being also in the form of an annular rubber tread. The greater diameters of the lower pulley portion 38 of the element as compared with the lower pulley portion 35a of the element 35, and the difference between the diameters of the upper pulley portions 37 and 35b of the elements 35 and 36 respectively, are predetermined, to afford different driving ratios, whereby the wheel 17 may be driven at different speeds by power supplied by the shaft 33 to one or the other of the lower pulley portions 38 or 35a, and delivered to the wheel tread respectively by one or the other of the upper pulley portions 35b or 37.

Mounting means for said pulleys 35 and 36 and manually adjustable means for variously disposing said pulleys for the different operative positions will now be described:

A pair of L-shaped levers 40 and 41 are pivotally secured together by a relatively large headed bolt 42 having a reduced screw-threaded end 43 which passes through aligned apertures of the two levers to secure said elements, to the supplemental plate 11, a clamping nut 44 being secured below the plate 11 onto said threaded end of the bolt. A spacer element or washer 45 is preferably interposed between the pivot end of the lowermost lever 40 and the supplemental plate 11, and a thin apertured disc 45ª is interposed between the relatively large head of the bolt and the uppermost portion of the superposed end of the lever element 41. Relative pivoting movement of the one lever element with respect to the other, is thus afforded.

The levers 40 and 41 are similarly formed to have a pair of inwardly projecting lateral extensions respectively at 46 and 47 hereby called cam shoes, said shoes having relatively interspaced end edges, and a tensile helical spring 53 secured at its ends, respectively at 54 and 55 to said shoes tend to draw the shoes together.

The lever 40, however, is shorter than the other lever 41, and is provided with longitudinally interspaced pairs of substantially L-shaped ear flange extensions each of which have a first vertical section which supports an inturned horizontal end section, said ears adapted to define a slideway on the upper surface of the lever 40, for a longitudinally extending slide extension in the form of a strip 40b which is confined in place on the upper surface of the lever by said ear-flanges, and adapted for sliding longitudinal movement thereon. A tensile helical spring 60 is secured by its ends respectively at 40g to a rearmost upturned flange 49e of the slide 40b, and a more forwardly disposed part of the lever 40 which part is conveniently afforded by an end of that one of the forwardly disposed pair of each flanges which is designated as 40f, the companion of said ear 40f being shown at 40c.

One of the rearmost pair of ear flanges of the lever 40 is shown at 40d, the companion thereof being disposed adjacent thereto at the relatively opposite side of the lever 40, and said rearmost flanges afford a convenient abutment for the end flange 40e of the slide strip 40b to limit the degree of forward movement of the slide 40b, in response to the retractive effort of the spring 60.

A pair of pulleys respectively shown at 35 in Fig. 20, and at 36 in Fig. 21, are respectively carried upon upstanding bearing posts 61 and 64 which are respectively affixed at 62 and 65 on end portions of the slide 40b of the lever 40, and of the lever 41, said pulleys being previously described, and being retained on said posts by retainers 65' and 66. A bell-crank lever 50, having a handle 51, is pivoted on a screw 52 mounted on the plate 11, and its inner short arm 49 carries a cam post 48 which is interposed between the relatively confronting end edges of the cam shoes 46 and 27 and is adapted to be engaged with either or both of said shoe edges as shown in Figs. 2 and 3, or Fig. 1, for the respectively different adjustment positions of the cam post 48.

The adjustment lever 50 is provided with an intermediately stepped shiftable handle portion 51 which projects laterally outwardly from below the turntable, manually operated lateral movement of the shiftable handle portion 51 of the lever being communicated by means of the post 48 through either the shoe 46 or the shoe 47 to either lever 40 or 41, and hence to the pulleys 35 or 36 supported thereby. A neutral inoperative position of adjustment of the pulleys 35 and 36 is achieved by means of the manually operated adjustment lever, wherein, as shown in Fig. 1 said lever is shown as being swung to the "off" position indicated in Fig. 1, both of the pulley elements being then maintained out of contact with the idler wheel and out of contact with the motor shaft.

Figure 3:
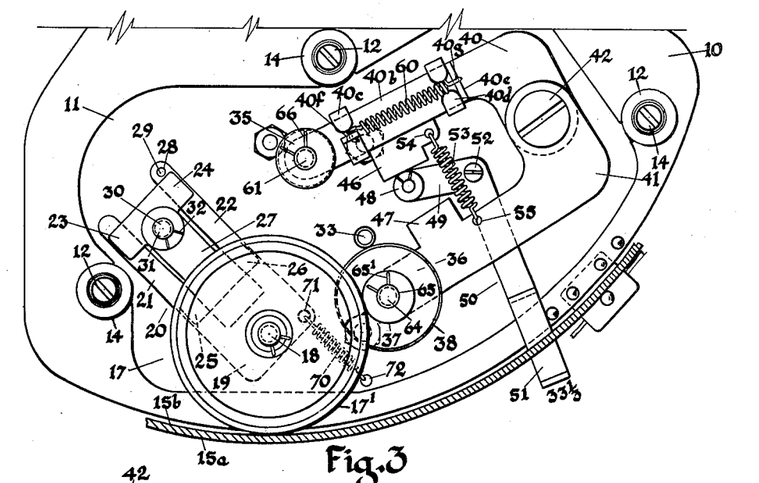
Fig. 3 is a top plan view similar to Figs. 1 and 2 showing the parts in the 33 R. P. M. turntable driving position.

When the post 48 is moved by swinging the lever 50 to the position shown in Fig. 3, for example, to cam the shoe 46 and the lever 40 into the swung position shown therein, the spring 53 pulls the lever to cause its following element 41, arcuate movement with respect to the lever 40, said following movement of the lever 41 being only limited by the lower step 38 of the pulley 36 being swung into engagement with the motor shaft 33, at which time the uppermost step portion 37 of the pulley 36 is also brought into contact with the tread portion 17' of the relatively larger wheel 17. With the upper and lower pulley portions 37 and 38 of the pulley 36 respectively engaged with the wheel tread 17' and the motor shaft 33, the shaft 33 frictionally drives the lower said pulley portion 38 to rotate the upper pulley portion 37 which in turn frictionally drives the wheel 17, and the respective rotational rates of the motor shaft 33, pulley 36, wheel 17, and turntable flange 15a with which the wheel tread is in driving engagement, being successively reduced in accordance with well-known gear ratio principles, so that with the successive driving elements 33, 36, and 17 being of proper predetermined diameters, the turntable of still greater diameter, may be driven at a rate of 33 R. P. M. under conditions of a normal much higher rate of rotation of the drive shaft 33.

Figure 2:
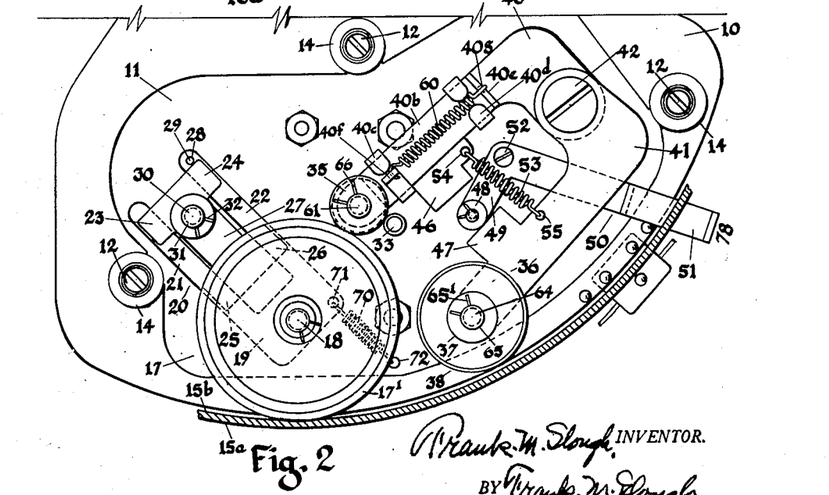
Fig. 2 is a top plan view similar to that of Fig. 1 and showing the operating parts in the 78 R. P. M. turntable driving position.

When the lever arm 51 is moved to the position indicated in Fig. 2, by the numeral 78, the post 48 is brought into engagement with the shoe 47 and cams said shoe and the lever element 41 with which it is associated outwardly, to move the pulley 36 outwardly to disengage the pulley portion 38 from the motor shaft 33, and also to disengage the upper pulley portion 37 of the pulley 36 from the idler wheel tread 17'. At the same time the lever 41 is drawn by the spring 53 to carry the pulley 37 in a following direction until its movement is limited by means of its then engagement with the motor shaft 33 and the friction wheel 17. The spring 60 and slide connection of the plate 40a, with relation to the lever element 40, permits a limited amount of movement between the pulley 35 and the idler to compensate for any irregularities in the lateral positioning of the tread portion 17', thereof.

With the idler pulley 35 having its upper and lower pulley portions 35b and 35a, both of the same diameter, concurrently peripherally in friction engagement with said wheel tread 17', and said shaft pulley portion 33, the peripheral speed imparted to the wheel 17 will be substantially equal to that of the pulley surface of the motor shaft 33.

As an example it may be assumed that the motor shaft is of such a diameter, and rotated at such a rotational speed that equality between the peripheral speed of the motor shaft and that of said wheel, will be effective to drive the turntable at a rotational rate of about 78 R. P. M., which may thus be achieved by making the two pulley portions of the pulley 35 of the same diameter. In contrast, the peripheral speed of the upper pulley portion 37 of the pulley 36 is less than that of the shaft pulley portion 33, whose peripheral speed is imposed upon the lower pulley portion 38, and therefore with the pulley 36 operative, the turntable will be driven at such a lower rotational speed, such as 33 R. P. M.

When the shift lever 51 is moved to the "off" position as so designated in Fig. 1 the parts assume the position shown in Fig. 1 and both pulleys are maintained out of engagement with the motor shaft and the friction wheel, as a result of the tong shoes 46 and 47 being brought into engagement with the adjusting post 48. In each of the three adjustment positions, the idler wheel shown is maintained in engagement with the inner peripheral surface of the flange of the turntable flange 15.

Spring means 70 are shown anchored at one end to the yoke portion of the slide 20 projecting an end thereof through an aperture 71 and turning said end under the bottom of the plate and at the other end anchored to the supplemental plate by means of an aperture 72 provided in said supplemental plate, the opposite end of said spring 70 projecting therethrough and under. Said spring means are adapted to yieldably apply a resilient effort to the idler wheel tending to maintain peripheral engagement of the friction wheel, which is supported by the slide, with the inner surface of the said turntable flange, to which the tread 17' of the wheel 17 is applied.

In the adjustment of the lever 51 from either operative position to the other operative position, to project the respective upper and lower pulley portions of one or the other of said pulley elements 35 or 36 into concurrent driving engagement, by its upper portion with the friction wheel 17 and, by its lower portion with the motor shaft 33. The lever 51 during the same adjustment movement, effects disengagement from the wheel tread 17' and the motor shaft, of the other pulley element which had previously been engaged with said wheel and said shaft. Both pulley elements are bodily adjustably movable, in the horizontal directions only.

A second preferred embodiment of my invention is shown in Figs. 10 to 19 inclusive, wherein operative idler pulleys 135 and 136 are respectively journalled on posts 135' and 136', which are mounted upon corners 160 and 161 of a slide plate 140 which is similar to the slide plate 11, the said pulleys being maintained on said posts by hair-pin retainer means 162 and 163.

The I-shaped slide-supporting block 170 is similar to the blocks 27 and 170, but is preferably longitudinally shorter; a spring 173 is secured by one end to a pin 172 carried by the block 170, and its opposite end is conveniently secured to a free end of one of the legs of the U-shaped slide 140, and is effective to resiliently bias the pulley-carrying slide forwardly.

A journal post 180 secured, by its lower end, to the supplemental plate 11 is projected upwardly through a bearing bore of the said block, with its slide 140 which carries the pulleys 135 and 136, being thus adjustably swingable on the post 189.

Figure 10:
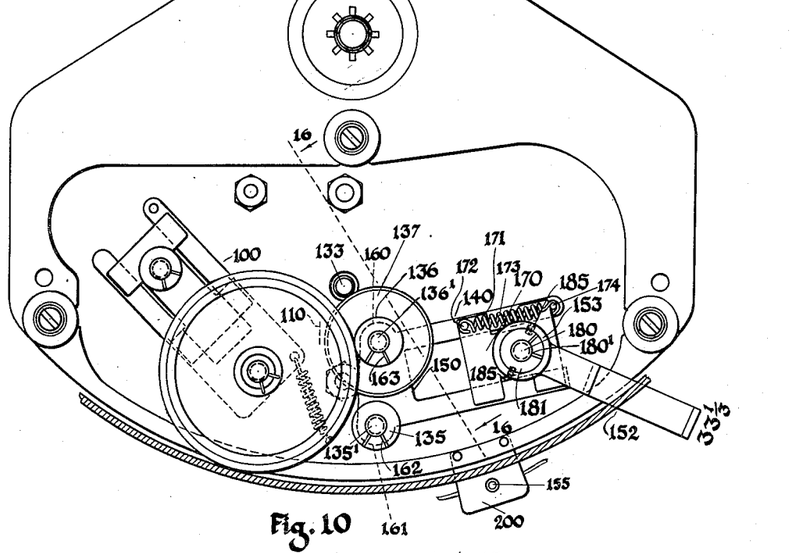
Fig. 10 is a top plan view similar to Fig. 3 but showing a second embodiment of my invention.

In the operative position of parts shown in Fig. 10 the shift lever 152 has been placed in a laterally swung position which is marked "33⅓". At this position the lever 152 has swung the slide holder 170 to the position shown, wherein the pulley portion 137 of the pulley 136, which is disposed at the relatively low level of the shaft pulley 133, is brought into frictional peripheral engagement with the motor shaft 133, while its uppermost pulley portion which is of relatively lesser diameter has, by the same adjustment movement of the lever 152, been brought into engagement with the tread surface of the friction wheel 110.

Therefore the wheel is driven by said pulley 136 and the turntable flange 15a which is disposed in driving engagement with the tread of the wheel 110 is driven by the wheel to cause it to rotate at desired rotational rate of 33⅓ R. P. M. When the handle 152 is then moved to the position shown in Fig. 11, wherein it is disposed adjacent to the designation "78," the slide holder 170 is so swung by the lever 152 in the clockwise direction as to move the lowermost pulley portion 137 of the pulley 136 out of contact with the motor shaft 133 and to concurrently move the upper pulley portion thereof out of contact with the tread of the wheel 110, and by the same swinging movement of the lever 152, the pulley 135 is caused to engage, by its uppermost portion 135a, and by its lowermost preferably rubber tread portion 135b, respectively, with the idler wheel tread and the pulley portion 33 of the motor shaft, respectively, as shown.

Figure 12:
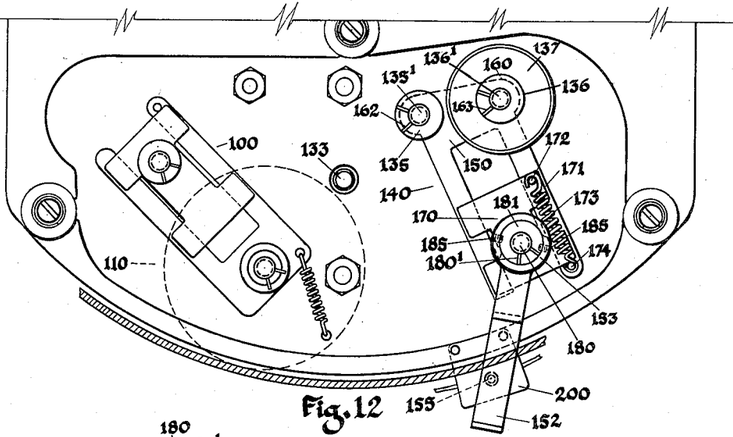
Fig. 12 is a top plan view of the second embodiment of my invention showing the parts in the position operative position corresponding to that of Fig. 1.
Figure 13:
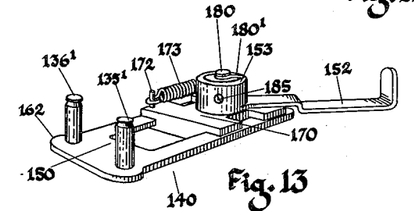
Fig. 13 is a perspective view of the slide plate shown in Figs. 10 to 12 inclusive showing pulley posts mounted thereon.
Figure 14:
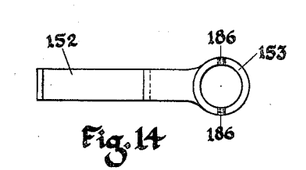
Fig. 14 is a top plan view of the lever of Figs. 10 to 13 inclusive.
Figures 15, 16, 17, 18, 19:
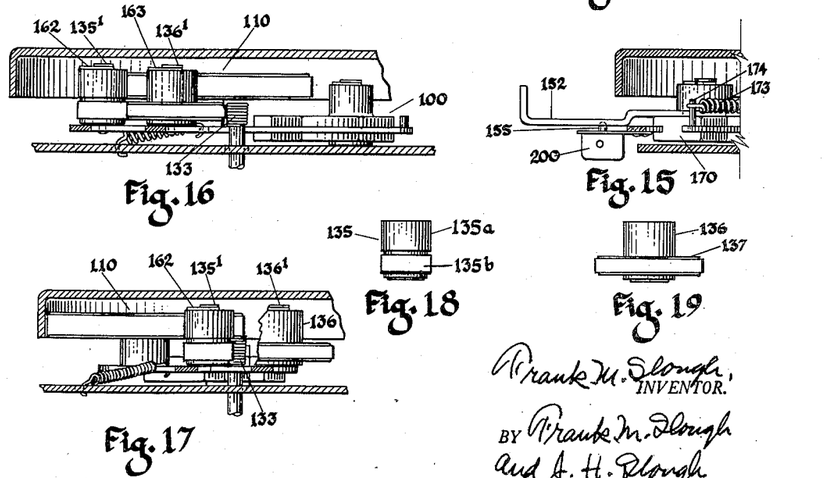
Fig. 15 is a side elevational view of the lever of Fig. 14.
Fig. 16 is a side elevational view taken along the line 16—16 of Fig. 10.
Fig. 17 is a view similar to Fig. 16 but taken along the line 17—17 of Fig. 11.
Fig. 18 is a side elevational view of the idler pulley element which is adapted to drive the turntable at 78 R. P. M.
Fig. 19 is a side elevational view of the second pulley element which is adapted to drive the turntable at 33 R. P. M.

In the position which the parts assume when the lever 152 is further moved in the same clockwise direction to the position shown in Fig. 12, the slide holder 170 and its associated pulleys 135 and 136 are concurrently moved entirely out of contact with the tread of the friction wheel 110 and also out of contact with the motor shaft 133, and at this time, the outwardly projecting portion of the shift lever 152 is caused to engage the switch button 155, depressing the same and disconnecting the motor, during the above described neutral, inoperative, "off" adjustment position of the described parts.

In moving either of the lowermost pulley portions 137 and 135b, respectively of the pulleys 136 and 135, from their successively described positions of engagement with the motor shaft pulley 133, each of the said lowermost pulley portions 137 and 135b ride over said pulley 133 and are cammed thereby to cause the pulley-carrying slide 140 to retract on the holder 170 against the pressure of the yieldable spring 173 until both of said pulleys 136 and 135 are swung clockwise, beyond the shaft pulley 133.

Figure 11:
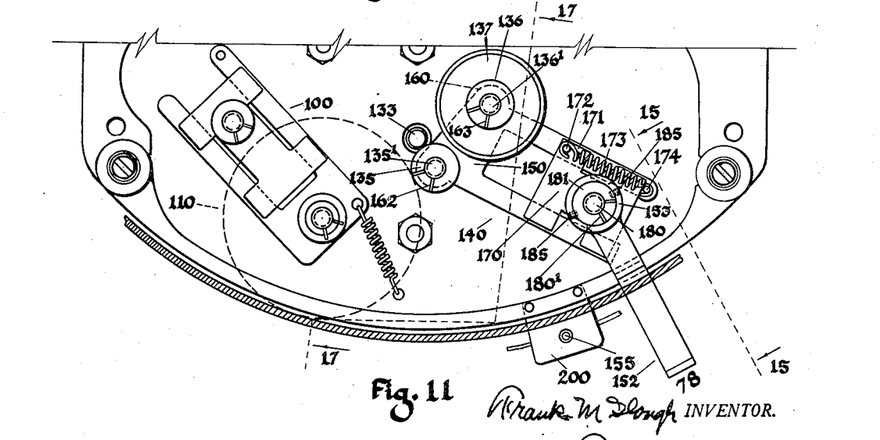
Fig. 11 is a top plan view similar to Fig. 10 but showing the operating parts in their position corresponding to that of Fig. 2.

At a time when either or both of the lowermost portions 135b of the pulley 135, and the lowermost portion 137 of the pulley 136, are preliminarily disposed, in the clockwise direction, beyond the position of the shaft pulley 133, any such inoperatively positioned pulley may be restored to the illustrated operative position therefor, which for the respective pulleys 136 and 137, are respectively shown in Figs. 10 and 11, by rotating the lever in the counter-clockwise direction to either the position shown in Fig. 11, or the position shown in Fig. 10, to respectively effect driving of the turntable at the exemplary speeds of 78 R. P. M. or 33⅓ R. P. M. respectively. During such counter-clockwise adjustment movement the lower pulley portion of any such inoperatively placed pulley will again ride over the shaft pulley 133, which again deflects it, to its illustrated operative position with respect thereto.

Although I have described my invention in connection with certain preferred embodiments thereof, I am aware that numerous and extensive departures may be made therefrom, without, however, departing from the spirit of my invention and the scope of the appended claims.

I claim:

1. A friction drive transmission mechanism for communicating rotary movement from a motor shaft to a phonograph turntable to drive the same at either of two substantially different rotational speeds comprising in combination with a substantially cylindrical pendant flange of the turntable and said shaft, an idler wheel, spring means adapted to press the periphery of said wheel against the inner surface of the flange, a pair of friction drive pulley elements adapted to be separately and alternately interposed in friction drive relation between said wheel and said shaft, a first of said elements comprising a pair of coaxial upper and lower pulley portions of which the upper portion is of least diameter, and the lower larger pulley portion adapted to be engaged with said shaft while the upper pulley portion is concurrently engaged with said wheel, selective adjustment means adapted to be adjustably moved to disengage either one of said elements from said wheel and from said shaft and to engage the other element therewith.

2. A motor transmission mechanism for selectively driving a phonograph turntable at substantially different rotational speeds of the type wherein a series of peripherally interengaged rotatable elements are interposed between a peripherally annular driving element of a motor shaft and an annular pendant flange of the turntable, comprising in combination with said flange and said driving element, a first one of said rotatable elements being peripherally engageable with a lateral surface of said flange, a plurality of other said rotatable idler pulley elements each having peripheral portions engageable concurrently with said flange surface and with said shaft driving element, a manually adjustable member moveable to at least two different adjustment positions, means operable responsive to different movements of said member adapted to inter-changeably dispose said rotatable idler pulley elements in an operative position, whereby to interpose and engage said rotatable idler pulley elements between said flange surface and said surface of said driving element, at least one of said rotatable idler pulley elements being of stepped formation to provide a pair of axially aligned, relatively superposed portions having peripheral annular surfaces of relatively different diameters, said last named surfaces being of substantially different diameters, and one surface thereof being engageable with said driving shaft surface and the other with the periphery of said first rotatable element, whereby a peripheral speed-change is communicated from said shaft to said first element when said stepped idler pulley element is operatively engaged with said first element and said driving element, in interchangeable substitution for operative engagement by any other of said pair of rotatable elements with said first element and said driving element.

3. The transmission mechanism substantially as set forth in claim 2, characterized by said first element being provided with a peripheral facing of yieldable friction material and the peripheral annular surface portion of each of said idler pulley elements which is adapted for engagement with said driving shaft element being also peripherally faced with yieldable friction material.

4. The transmission mechanism substantially as set forth in claim 2, characterized by the provision of carrier means, said rotatable elements separately journalled on said carrier means, and said adjustment means adapted to selectively move said carrier means to interchangeably position said rotatable idler pulley elements in their said operative and inoperative positions.

5. The transmission mechanism substantially as set forth in claim 2, characterized by said rotatable elements, said shaft element, and said flange, being each provided with a substantially smooth friction surface, a peripheral portion of said first rotatable element and each of said idler pulley elements having a pulley portion which is disposed below said smooth surface portion and which is provided with a pulley facing of rubber or other slightly compressible material, the provision of a pair of differentially movable mounts, each rotatable element so journalled upon a different mount as to be rotatable about a vertical axis, spring means adapted to resiliently tend to force each of said mounts in such a direction as to effect peripheral engagement between its associated rotatable element and the peripheries of said shaft element and of said first rotatable element, and said adjustable element adapted during each of different adjustment movements to alternately disable said spring means with respect to its effect upon either selected one of said mounts and its associated rotatable element and concurrently restoring the ability of said spring to force the other mount to a position wherein its associated rotatable element is spring pressed to engage said shaft element and said first rotatable element.

6. A motor transmission mechanism for selectively driving a phonograph turntable of the type having a pendant peripheral tubular flange at substantially different speeds, comprising in combination with a vertically extending motor shaft, an idler wheel which is so disposed as to be peripherally frictionally engageable with a lateral surface of a turntable flange, and a plurality of idler pulleys, each having a pair of relatively superposed coaxial pulley portions, at least one thereof being of stepped formation, all upper of said pulley portions being disposed at the level of said idler wheel periphery, said shaft extending to the levels of each said lower pulley portion of each said idler pulley, mount means having portions adapted to afford laterally interspaced supporting journals for said pulleys, said wheel, pulleys and shaft being rotatable on parallel vertical axes, and manually operable adjustment means adapted to so move said mount means for said idler pulleys as to selectively dispose any of said idler pulleys in its operative position with its said upper pulley portions in frictional engagement with the periphery of said wheel and with its lower portion in frictional peripheral engagement with a pulley portion of said shaft, and said adjustment means adapted to concurrently move another idler pulley from a corresponding operative position of adjustment with respect to said wheel and shaft.

7. The motor driven phonograph turntable transmission substantially as set forth in claim 6, characterized by the recited mount means thereof comprising a pair of support mounts, one for each idler pulley, and said adjustment means comprising a handle, and by the provision of spring means normally exerting resilient pressure upon each of said support mounts tending to force each of them toward its operative position, and by said adjustment means comprising an actuator adapted, in response to movement of said handle to different adjustment positions thereof, to retract one or the other of said support mounts from its recited operative position, and to concurrently condition said spring means to effect movement of the relatively other support mount to cause the idler pulley thereof to be moved to its said operative position of adjustment.

8. The motor driven phonograph turntable transmission substantially as set forth in claim 6, characterized by said idler pulleys being two in number, and by the provision of a relatively fixed support and by said mount means comprising a pair of plates, each pivoted at its rear end portion upon said support and adapted to swing its free end about its pivot, each one of said pulleys being journalled upon a swingable portion of a different one of said plates at such a distance from the pivotal axis of its associated plate and from said shaft, and a peripheral portion of said wheel being relatively so disposed, that said plates may be concurrently swung by said adjustment means, at different times in opposite directions, to interchangeably dispose one or the other of said idler pulleys in the recited operative position to effect concurrent frictional engagement by its respective pulley portions with said shaft and said wheel periphery, and spring means adapted to communicate swinging movement imparted to one of said plates, to the other plate, said adjustment means being adapted in any adjustment position to so engage one or the other of said plates as to prevent such operative positioning of more than one of said pulleys at any one time.

9. The transmission mechanism for driving phonograph turntables of the pendant tubular flanged type, comprising in combination with said flange, an idler wheel, a pair of pulleys and a motor shaft affording a pulley surface, said turntable, said wheel, said pulleys, and said shaft journalled to rotate on vertical axes, with said wheel disposed in peripheral frictional engagement with an inner surface of said flange, and with alternate of said pulleys adapted to be selectively interposed between and to make concurrent peripheral engagement with both said wheel and said shaft pulley surface, one of said pulleys being of diametrically stepped formation to afford a lower pulley portion of greatest diameter and a relatively co-axial superposed upper portion of relatively less diameter and said upper pulley portion adapted only for engagement with the periphery with said wheel while said lower pulley portion is adapted for engagement with said shaft surface, and manually operable means adapted to selectively interpose either of said pulleys between, and in concurrent frictional engagement with said wheel and shaft peripheries.

10. The transmission mechanism for phonograph turntables substantially as set forth in claim 1, characterized by a movable mount for said wheel and said spring means being so located and applied to said mount as to tend to move the wheel in such a direction as to tend to roll it on said engaged flange surface, and by the provision of a support upon which said pulley elements are journalled to rotate on separate vertical and relatively laterally interspaced axes, said support disposed at one side of said motor shaft and said idler wheel and said pulley elements being so secured to the support as to be adapted to project therefrom towards peripheral surfaces of both said shaft and of said wheel, and said support being adapted to be laterally so moved in either relatively opposite directions as to effect engagement by either selected one of said pulley elements simultaneously with said shaft and wheel, and by the provision of second spring means tending to exert pressure on said support to yieldably urge said elements in such a direction as to press said selected pulley element against said wheel surface in opposition to the wheel rolling effort of the previously recited spring, whereby said wheel periphery, while remaining engaged with said flange, is displaced sufficiently to permit said selected element to also peripherally engage said shaft surface.

11. A two-speed drive for phonograph turntables of the type having a pendant annular flange, comprising in combination, an idler wheel having a peripheral friction tread adapted for peripheral engagement with a turntable flange to drive the same, a pair of idler pulleys, and a motor shaft affording a drive pulley, a plurality of separate laterally movable mounts, one for each of said pair of pulleys and another for said wheel, said wheel, pulleys and shaft all disposable below the turntable and being rotatable on vertical axes on lateral interspaced journals, at least one of said pulleys being stepped to afford upper and lower peripheral pulley surfaces of respectively lesser and greater diameters which are respectively disposed at the respective levels of said wheel tread and of said drive pulley, a movable adjustment element adapted to be manually selectively moved in either opposite direction to any of a plurality of adjustment positions, said pulley mounts being laterally movable in response to different selective adjustment movements of said element to effect concurrent peripheral engagement, by the respective lower and upper pulley surfaces of any thereby selected one of said idler pulleys, respectively with relatively converged peripheral surfaces of said shaft and of said wheel, and spring means adapted to yieldably maintain any selected one of said idler pulleys in spring pressed peripheral engagement with said wheel and drive pulley and to yieldably resist relatively disengaging movements of said wheel tread with respect to the inner surface of the turntable flange with which said wheel tread has been placed in relative engagement.

12. The friction drive mechanism for phonograph turntables substantially as set forth in claim 11, characterized by said adjustment element being adapted for adjustment movement by said element to a neutral non-selecting position, wherein all said idler pulley surfaces are free of engagement with said drive pulley and said idler wheel.

13. The motor driven phonograph turntable transmission substantially as set forth in claim 11, characterized by said mount means comprising a pair of plates one for each pulley, and said adjustment means comprising a laterally extending actuating portion, spring means normally exerting resilient pressure upon each of said mount means tending to force each of them towards its operative adjustment position wherein it is engaged with said motor shaft, and said adjustment means comprising a movable portion so disposed below the turntable and adapted, responsive to movement of said actuating portion to one or the other of two adjustment positions thereof, to force one of said pulleys laterally away from its said operative position and to concurrently effect movement of the relatively other pulley to its operative position.

14. A selective plural speed friction drive mechanism for phonograph turntables having an annular flange, comprising a vertical motor shaft affording a pulley end portion, a plurality of relatively laterally disposed friction drive pulley elements, movable mount means adapting said elements for lateral shifting movement, a wheel having a friction tread and a movable mount therefor adapting it for lateral movements, said wheel being so disposable as to effect engagement of its tread with a phonograph turntable flange, each of said elements having an upper and a lower pulley portion which are respectively disposed at the levels of said tread and said shaft portion, the ratio of relative diameters, of said pulley portions in the case of different of said elements, being substantially different, adjustment means having an actuating member adapted to be adjustably moved from and to, different interspaced stations located in a path of movement which is of like directional nature throughout, said mount means for said elements so being laterally movable in response to station-to-station adjustment movements of said actuating member to effect disengagement from said wheel tread and said shaft portion of the upper and lower pulley portions, respectively, of any one of said elements whose said portions have been previously, respectively engaged therewith, and in response to the same adjustment movement thereof, to effect engagement of the respective upper and lower pulley portions of another of said elements with said wheel tread and said shaft pulley portion respectively, spring means adapted to yieldably apply a laterally directed resilient effort tending to maintain said wheel tread in engagement with an upper pulley portion of an operatively positioned one of said elements, and concurrently adapted to yieldably oppose lateral displacement of said wheel, by the effect of the engagement of its tread with any said thereby engaged turntable flange.

15. In a plural-speed friction drive mechanism for phonograph turntables of the type comprising a peripheral pendant flange, a motor drive shaft affording a pulley portion, of a wheel having a friction tread which is peripherally engageable with the inner flange surface of a turntable, a plurality of idler pulley elements, said elements being interchangeably laterally engageable respectively by upper and lower portions thereof with said wheel tread and said shaft portion, respectively, the diametrical ratios between the upper and lower portions of the different of said elements being relatively different, manually operable selective adjustment means adapted to differently adjust the lateral positions of said elements whereby any selected one of said elements may be so disposed as to have its said upper and lower portions respectively engaged with said wheel tread, and with said shaft pulley portion, and the said adjustment means, by the same adjustment movement, adapted to displace another of said elements whose upper and lower portions have been respectively previously, out of engagement therewith.

16. The plural-speed friction drive mechanism substantially as set forth in claim 15 characterized by the provision of laterally movable mount means for said wheel affording a journal upon which said wheel is adapted to rotate about a vertical axis, laterally movable mount means for said pulley elements affording separate journals for each thereof and each said element rotatable on its journal about a vertical axis, and said adjustment means adapted to communicate laterally adjustment movements to said wheel and said elements through their said mount means.

17. The plural-speed drive mechanism substantially as set forth in claim 15, characterized by the recited adjustment means comprising a laterally swingable lever and by pulley elements being separately journalled in laterally interspaced relation on a laterally swingable portion of said lever and said lever comprising a shiftable actuating end portion movable between different laterally interspaced stations in a path of movement which is of like directional nature throughout to interchangeably dispose any thereby selected one of said elements in either an operative or inoperative position wherein its respective upper and lower portions are in or displaced from engagement respectively with said wheel tread and said shaft portion.

18. The plural-speed friction drive mechanism substantially as set forth in claim 15 characterized by said adjustment means being in the form of a lever having different actuating portions, said pulley elements being each separately journalled for rotation about a vertical axis in relatively interspaced relation and said actuating portion adapted to be moved to any of a plurality of laterally interspaced stations in a path of movement therefor which is of uniform like directional nature throughout to interchangeably dispose said pulleys to effect operative engagement by its respective upper and lower portions with said wheel tread and said shaft pulley portion respectively.

19. A friction drive transmission mechanism for communicating rotary movement from a motor shaft to a phonograph turntable having an annular pendant flange, to drive the same at substantially different rotational speeds, comprising a friction wheel having a friction tread, a pair of friction drive pulley elements adapted to be separately and alternately interposed in friction drive relation between said wheel and said shaft, each of said elements comprising a pair of co-axial upper and lower pulley portions which are respectively at the levels of said wheel and shaft and in the case of at least a first of the said elements, the upper pulley portion being of least diameters, the lower pulley portion of either of said elements adapted to be engaged with said shaft while the upper pulley portion thereof is concurrently engaged with said wheel, spring means adapted to bias said wheel toward said pulley elements, and selective adjustment means adapted to be adjustably moved to disengage the respective upper and lower pulley portions of that one of said elements whose said respective portions have been previously engaged with said wheel and shaft, from said wheel and from said shaft respectively, and adapted, responsive to the same adjustment movement, to engage the corresponding pulley portions of the other element with said wheel tread and said shaft pulley portion.

20. The transmission mechanism for driving phonograph turntables of the pendant tubular flanged type, comprising a friction wheel, a plurality of pulleys, and a motor shaft affording a pulley surface, said wheel, said pulleys, and said shaft journalled to rotate on vertical axes, said wheel being disposable in peripheral frictional engagement with an inner surface of a turntable flange, each of said pulleys having an upper and a relatively co-axial lower pulley portion, adapted to be interchangeably selectively interposed between, and in concurrent peripheral engagement by its respective upper and lower portions, with said wheel and said shaft pulley surface, at least one of said pulleys being of diametrically stepped formation to cause its lower pulley portion to be of relatively greater diameter and an upper portion to be of relatively less diameter, and manually operable adjustment means adapted for differing adjustments to selectively interpose any of said pulleys between, and in concurrent frictional engagement by respective upper and lower portions thereof with said wheel and shaft peripheries.

21. A selective plural speed friction drive mechanism for phonograph turntables having an annular flange, comprising a vertical motor shaft affording a drive pulley, a plurality of relatively laterally disposed friction drive idler pulleys, movable mount means adapting said idler pulleys for lateral shifting movement, a wheel having a friction tread and a movable mount therefor adapting it for lateral movements, said wheel being so disposable as to effect engagement of its tread with a phonograph turntable flange, each of said idler pulleys having upper and lower pulley portions adapted for lateral engagement respectively with said tread and said drive pulley, an adjustment member adapted to be manually moved to any of different relatively interspaced adjustment positions which are located in a path of movement which is of like directional nature throughout, said mount means being differently adjustable in response to different station-to-station adjustment movements of said member to selectively dispose any selected single one of said idler pulleys in the line of drive between said drive pulley and said wheel tread, or to selectively displace all thereof from said line of drive, the ratio of diameters between relatively engageable portions of said drive pulley and said lower portions of different of said idler pulleys being substantially different to cause the different idler pulleys to be rotated at different speeds, and spring means adapted to yieldably maintain the said upper and lower portions of an operatively selected one of said idler pulleys in peripheral engagement respectively with said wheel tread and drive pulley.

22. A friction drive transmission mechanism for communicating rotary movement from a motor shaft to a phonograph turntable of the type having a peripheral pendant flange, to drive the same at substantially different rotational speeds, comprising in combination with said shaft, an idler wheel having a peripheral tread portion adapted to be disposed in engagement with a turntable flange, spring means adapted to resiliently resist displacement of the periphery of said wheel from the inner surface of an engaged turntable flange, a plurality of friction drive pulley elements adapted to be separately selectively interposed in friction drive relation between said wheel and said shaft, said elements each comprising a pair of coaxial upper and lower pulley portions, the lower of which being adapted for engagement with said shaft while the upper pulley portion is concurrently adapted for engagement with said wheel, selective adjustment means adapted to be adjustably moved to disengage the said upper portion of one of said elements from said wheel and the lower portion thereof from said shaft, and by a continuation of the same adjustment movement to respectively engage upper and lower portions of another said element with said wheel, and with said shaft, respectively, the diameters of the interengaged peripheral portions of said shaft, said elements, and said wheel being relatively such, in the case of different of said elements that said wheel is driven at different rotational rates of speed in response to disposition of different of said elements in concurrent engagement, by its respective said portions with said wheel and shaft.

FRANK M. SLOUGH.

References Cited in the file of this patent

UNITED STATES PATENTS

| Number | Name | Date |
|---|---|---|
| 1,591,494 | Lanchester | July 6, 1926 |
| 2,119,218 | Rodger | May 31, 1938 |